March 24, 1959  D. G. C. PERRY  2,879,086
BRACKET
Filed March 5, 1956
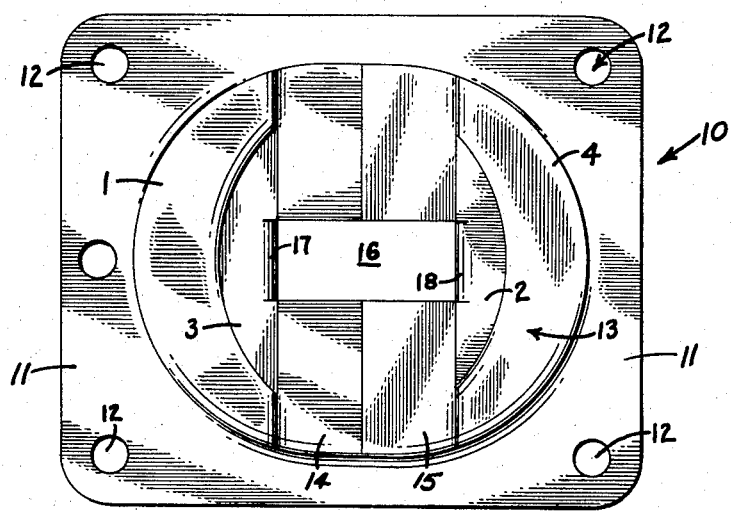
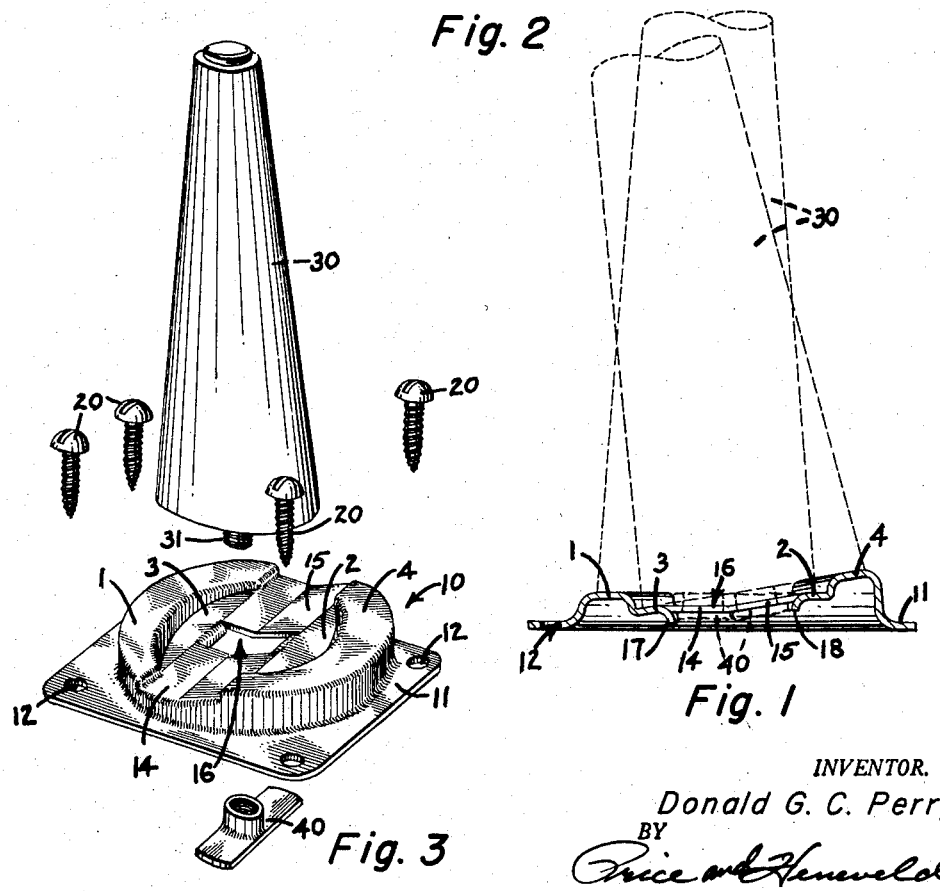
INVENTOR.
Donald G. C. Perry
BY
ATTORNEY United States Patent Office 2,879,086
Patented Mar. 24, 1959

2,879,086
BRACKET

Donald G. C. Perry, Grand Rapids, Mich., assignor to Perry Furniture Company, Grand Rapids, Mich.

Application March 5, 1956, Serial No. 569,411

8 Claims. (Cl. 287—20)

This invention relates to a bracket for supporting or securing a leg to furniture or other objects supported by the leg. More particularly this invention relates to a bracket for securing a support to a piece of furniture in one of several positions.

With the advent of do-it-yourself era, many families are making their own furniture or refurbishing old furniture. Frequently in making new furniture or refurbishing old furniture, the exact angle which the leg makes with the object it supports varies. In some instances it is desirable that the leg be perpendicular. In others the legs are inclined at an angle. This has required stores to carry an inventory of different shaped brackets for different inclinations of the legs. Heretofore, a purchaser buying this type bracket had to exchange it for a different desired angle.

An object of this invention is to eliminate these difficulties and provide a bracket which is adapted to secure the legs to furniture in one of several positions.

Another object of this invention is to provide a bracket for securing legs to furniture or other objects, said brackets being adapted to secure the legs at various angles to the furniture or object.

Still another object of this invention is to provide a bracket for securing legs to furniture in one of several positions without requiring the detachment of the bracket from the furniture.

Another object is to provide a bracket for supporting legs in such a manner that vibration and jarring of the leg has little effect in loosening the leg from the bracket.

Other objects of this invention will become obvious upon reading the following specification in conjunction with the accompanied drawings wherein:

Fig. 1 is a cross sectional, elevational view of the bracket showing the leg in phantom in either of two positions.

Fig. 2 is a plan view of the bracket.

Fig. 3 is an exploded, oblique view of the leg and bracket assembly.

Briefly, this invention relates to a bracket for securing a leg to a piece of furniture in one of several positions. The bracket includes a means for securing the bracket to the piece of furniture, and bearing points adapted to support the leg in one position. Immediately adjacent the two bearing points are second bearing points adapted to support the leg in a second position oblique to the first position. The bearing points in the preferred form of this invention consist of two steps on each side of the bracket. One of the steps at one side in conjunction with one step on the other side provides the bearing means for the leg in one position. Another step on the one side in conjunction with another step on the other side provides the bearing means for supporting the leg in a second position. In the preferred form of this invention an elongated slot is provided between the steps of each side and a stud secured to the top end of the leg extends through the elongated slot and is secured to the bracket by an elongated T-shaped nut. This elongated slot permits the stud with the nut loosely attached to slide from the first pair of steps to the second pair of steps without removing and detaching the leg from the bracket or the bracket from the piece of furniture.

Referring to the drawings, reference numeral 10 denotes the bracket having the flange 11 adapted to be secured to the furniture by screws 20 extending through the holes 12. The bracket has a central cupped portion 13 spaced from the plane on which the flange 11 is located.

The central cupped portion 13 has two arcuate shaped steps 1 and 3 on one side and 2 and 4 on the other side. As will be explained hereinafter the steps 1, 2, 3 and 4 provide bearing surfaces or points for the leg 30 when secured to the bracket. Extending between the two pairs of steps are the two intermediate webs 14 and 15 inclined at an angle to each other. As shown in Fig. 1, web 15 is inclined downwardly and joins horizontal web 14 at an angle. When secured to the bottom of a piece of furniture web 15 obviously extends upwardly in relation to the bottom surface of the furniture to which it is attached. These webs 14 and 15 as will be explained hereinafter, provide a bearing surface for the T-shaped nut 40 which secures the leg 30 to the bracket 10.

The webs 14 and 15 have an elongated slot 16 extending between the steps 2 and 3. At the end of slot 16 are the stop members or ears 17 and 18 formed by a tab bent downwardly as shown.

The steps 1 and 2, each located on opposite sides of the center of the bracket, are spaced from each other so that the top end of the leg 30 spans and bears against them (Fig. 1). In the specific example shown, the steps 1 and 2 have bearing surfaces level with each other, that is, the bearing surfaces are spaced equal distance from the plane of the flange 11. Thus, the leg 30 bearing against the surfaces of steps 1 and 2 extends vertically from the plane of flange 11 making the leg exactly perpendicular to the bottom surface of the furniture to which the bracket is secured. The steps 3 and 4 have surfaces inclined at an angle to the plane of flange 11 so as to support the leg 30 at an oblique angle to the bottom surface of the furniture piece. The surface of step 4 is spaced a greater distance from the plane of flange 11 than the surface of step 3. Thus, the leg is inclined at an angle as illustrated in Fig. 1. The steps 3 and 4 are spaced from each other so that the top end of the leg 30 can span and bear against them.

As illustrated in the drawings, steps 1 and 3 are located immediately adjacent each other. Steps 2 and 4 are also immediately adjacent each other. Thus, the position of the leg can be tipped easily by moving the top end of the leg a very short distance from steps 1 and 2 to steps 3 and 4 or vice versa.

The bracket 10 is constructed of sheet metal stamped into the shape shown. The gauge of the sheet metal permits some resiliency or play in web portions 14 and 15 which are spaced from the surfaces to which the bracket is attached. This, as will be explained in "Operations," helps to prevent the leg from jarring loose by vibrations or otherwise.

The leg is attached to the bracket by stud 31 extending through the elongated aperture 16 and secured to the bracket by the T-nut 40. The nut 40 is positioned to bear against the bottom surfaces of the web portions 14 or 15 and it extends transversely of the aperture 16, The T-nut 40 is prevented from turning by the stop members or ears 17 and 18.

Operations

The operation or use of this bracket is simple. It can be attached or secured to the bottom surface of the furniture with either the leg attached or not. If it is secured to the bottom of the piece of furniture before attaching the leg, it is necessary that the T-nut 40 be placed underneath the cupped portion 13 with its neck extending through the aperture 16. Then the screws 20 are inserted through the holes 12 and screwed into the bottom surface of the furniture. Having secured the bracket to the furniture the threaded stud 31 is then screwed into the neck portion of the T-nut. Depending upon the desired position of the leg, its top end is made to span either steps 1 and 2 or steps 3 and 4. With the top end of the leg bearing against either of these pairs of steps the stud 31 is screwed in tightly into the T-nut 40, which will bear against web 14 or 15.

Leg 30 can first be secured to the bracket before the bracket is attached to the bottom surface of the furniture. In this case, the desired position of the leg is determined and the leg secured to the bracket by the stud 31 and T-nut 40 as previously explained. Then the bracket is secured to the bottom surface of furniture it is to support.

In either of the two manners of operating and using this bracket, the position of the leg can be changed very simply by loosening the stud 31 slightly until there is sufficient clearance for the bottom end of the leg to pass from steps 1 and 2 to steps 3 and 4 or vice versa. Then the leg is positioned on either of these pairs of steps by sliding the stud and T-nut in the elongated opening 16. The stud 31 is then retightened into the neck portion of the T-nut 40. It should be realized that this operation of changing from one position to another is accomplished without removing the bracket or detaching the leg.

When assembled, the T-nut 40 bears against either of the bottom surfaces of web portions 14 or 15 depending upon the position of the leg (Fig. 1). In the vertical straight position the head of the elongated T-nut is prevented from turning by the ear 17 extending downwardly and providing a stop for the nut. In the other inclined position of leg 30 the head of the T-nut 40 is prevented from turning by the ear 18. Thus, in either position while the leg is tightened firmly on the bracket the nut 40 is prevented from turning and it is thus unnecessary to provide any means for holding the nut in position while securing the leg in either of the two positions.

As described previously the entire bracket and especially the web portions 17 and 18 are fabricated of a somewhat resilient metal which will give to some extent with the vibration or jarring of the legs. The webs 14 and 15 are spaced from the top surface of the leg. Thus, they hold the stud 31 in tension. This prevents the stud 31 from jarring loose from the T-nut 40 in contrast to what would happen if the bracket was an extremely rigid structure and the leg rested on the webs. Upon any jarring of the leg these web portions will give very slightly and take up such jarring or vibrations. This action can be likened to the action of a lock washer which takes up the vibrations and jars exerted on the nut.

The bracket 10 is useful on any type furniture or any other object supported by wooden tapered legs or otherwise. For example, this bracket is useful in securing legs to tables, desks, counter tops, TV sets, and other furniture. They are particularly useful for the legs as shown in the drawings.

It should be understood that although I have described and shown a preferred embodiment and modification of this invention, several other modifications are possible within the scope of this invention. For example, several sets of steps can be provided rather than two pairs as shown, in which case the leg could be adapted for more than two positions. In view of this possible adaptation and others this invention should be limited only as expressly set forth in the appended claims.

I claim:

1. A bracket for securing a leg to an object to be supported by said leg comprising: means for securing said bracket to said object; said bracket having a first bearing means adapted to support said leg in one position and a second bearing means adapted to support said leg in a second position oblique to said first position; said second bearing means being located immediately adjacent said first bearing means; said bracket having an elongated aperture extending from substantially the center of said first bearing means to the center of said second bearing means and adapted to receive a stud on the end of a leg for securing the leg to said bracket in either of said two positions; said elongated aperture permitting said leg to be moved from one position to the other without detaching the stud from said leg.

2. A bracket for securing a leg to an object to be supported by said leg comprising; flange means adapted for securing a support portion to said object on a first plane; a central offset support portion offset from said first plane and having first and second bearing means spaced one from the other and equally spaced from said first plane thereby being adapted to support said leg in one position perpendicular to said first plane, a third bearing means located immediately outwardly and adjacent said first bearing means, and a fourth bearing means located immediately inwardly and adjacent said second bearing means; one of said third and fourth bearing means being spaced a greater distance from said first plane than the other is spaced from said first plane; said third and fourth bearing means being spaced one from the other a sufficiently short distance to support said leg whereby said leg is adapted to be supported in a second position oblique to said first plane.

3. The bracket defined in claim 2 wherein there is provided an anchor portion between said first and fourth bearing means; said anchor portion having an elongated slot extending between said first and fourth bearing means; said slot being adapted to slidably receive a stud for securing said bracket to said leg; said slot permitting said leg to be moved from said one position to said second position without detaching the stud from said leg.

4. The bracket as defined in claim 3 in which the anchor portion has two flat bottom bearing surfaces on which the head of said stud can bear in either of said one or said second positions.

5. A bracket for securing a leg to an object to be supported by said leg comprising: means for securing said bracket to said object; a support portion connected to said securement means and having a recessed central anchor portion; opposite stepped sides extending from said anchor portion; said stepped sides including a first and third step on one side and a second and fourth step on the other side; said first and second steps providing bearing means for said leg so as to support it in one position; said third and fourth steps providing bearing means for supporting said leg in a second position oblique to said first position; an elongated slot in said anchor portion extending between said second and third steps and adapted to receive a stud for securing said bracket to said leg, said elongated slot permitting a leg with an attachment stud to be moved from said one position to the second position without detaching the stud from the leg.

6. A bracket for securing a leg to an object to be supported by said leg comprising: means for securing said bracket to said object; a support portion connected to said securement means and having a recessed central anchor portion; opposite stepped sides extending from said anchor portion; said stepped sides including a first and third step on one side and a second and fourth step on the other side; said first and second steps providing bearing means for said leg so as to support it in one position; said third and fourth steps providing bearing means for supporting said leg in a second position oblique to said first position; aperture means in said anchor portion adapted to receive a stud in either of said first or second positions for securing said bracket to said leg.

7. The bracket defined by claim 6 wherein said anchor portion is fabricated of semi-resilient material permitting a give in said portion when said leg is subjected to vibrations which tend to loosen the stud from said leg.

8. The bracket defined by claim 5 wherein the anchor portion has bottom bearing surfaces on which a rectangular head of said stud can bear; and ears extending from said bottom bearing surfaces in a position to prevent turning of said rectangular head.

References Cited in the file of this patent

UNITED STATES PATENTS

| | | |
|---|---|---|
| 880,415 | Stevens | Feb. 25, 1908 |
| 901,284 | Edmunds | Oct. 13, 1908 |
| 1,306,100 | Chadwick | June 10, 1919 |

FOREIGN PATENTS

| | | |
|---|---|---|
| 197,801 | Great Britain | May 24, 1923 |